United States Patent
Koga (10) Patent No.: US 12,362,385 B2
(45) Date of Patent: Jul. 15, 2025

(54) BATTERY HAVING A PLURALITY OF SOLID-STATE BATTERY CELLS

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 565 days.

(21) Appl. No.: 17/851,053

(22) Filed: Jun. 28, 2022

(65) Prior Publication Data

US 2022/0328872 A1     Oct. 13, 2022

Related U.S. Application Data (63) Continuation of application No. PCT/JP2020/045749, filed on Dec. 9, 2020.

(30) Foreign Application Priority Data

Jan. 24, 2020   (JP) ................................ 2020-010170

(51) Int. Cl.
*H01M 10/0562* (2010.01)
*H01M 10/0585* (2010.01)
(Continued)

(52) U.S. Cl.
CPC ... *H01M 10/0562* (2013.01); *H01M 10/0585* (2013.01); *H01M 50/291* (2021.01);
(Continued)

(58) Field of Classification Search
None
See application file for complete search history.

(56) References Cited

U.S. PATENT DOCUMENTS

2013/0149592 A1* 6/2013 Hayashi .............. H01M 50/512
429/160
2013/0149593 A1   6/2013 Hayashi et al.
(Continued)

FOREIGN PATENT DOCUMENTS

CN   103069639 A   4/2013
CN   106797046 A   5/2017
(Continued)

OTHER PUBLICATIONS

International Search Report of PCT application No. PCT/JP2020/045749 dated Mar. 2, 2021.
(Continued)

*Primary Examiner* — Jonathan Crepeau
(74) *Attorney, Agent, or Firm* — GREENBLUM & BERNSTEIN, P.L.C.

(57) ABSTRACT

A battery includes: a plurality of solid-state battery cells; and a connection layer located between the solid-state battery cells. Each of the solid-state battery cells has a structure in which a positive electrode current collector, a positive electrode active material layer, a solid electrolyte layer including an inorganic solid electrolyte, a negative electrode active material layer, and a negative electrode current collector are laminated in this order. The solid-state battery cells are electrically connected in series. The positive electrode current collector of one of a pair of the solid-state battery cells and the negative electrode current collector of the other of the pair of the solid-state battery cells are laminated via the connection layer, the pair of the solid-state battery cells are adjacent solid-state battery cells among the solid-state battery cells. The connection layer includes a conductive material, and the Young's modulus of the connection layer is lower than the Young's moduli of the positive electrode current collector, the positive electrode active material layer, the solid electrolyte layer, the negative
(Continued)

electrode active material layer, and the negative electrode current collector.

11 Claims, 3 Drawing Sheets

(51) Int. Cl.
*H01M 50/186* (2021.01)
*H01M 50/19* (2021.01)
*H01M 50/198* (2021.01)
*H01M 50/291* (2021.01)
*H01M 50/293* (2021.01)
*H01M 50/471* (2021.01)
*H01M 50/51* (2021.01)
*H01M 50/526* (2021.01)

(52) U.S. Cl.
CPC ....... *H01M 50/293* (2021.01); *H01M 50/471* (2021.01); *H01M 50/51* (2021.01); *H01M 50/526* (2021.01); *H01M 50/186* (2021.01); *H01M 50/19* (2021.01); *H01M 50/198* (2021.01)

(56) References Cited

U.S. PATENT DOCUMENTS

| 2014/0193689 A1 | 7/2014 | Takami et al. |
| 2017/0279113 A1 | 9/2017 | Ohsawa et al. |

FOREIGN PATENT DOCUMENTS

| EP | 1986250 B1 | 11/2018 |
| JP | 2000-195495 | 7/2000 |
| JP | 2005-317468 | 11/2005 |
| JP | 2008-311173 A | 12/2008 |
| JP | 2018-125215 A | 8/2018 |
| JP | 2019-096476 | 6/2019 |
| WO | 2013/140565 | 9/2013 |
| WO | 2014/162532 A1 | 10/2014 |

OTHER PUBLICATIONS

The EPC Office Action dated Dec. 7, 2023 for the related European Patent Application No. 20915728.8.
English Translation of Chinese Search Report dated Feb. 28, 2025 for the related Chinese Patent Application No. 202080093734.2.

* cited by examiner

BATTERY HAVING A PLURALITY OF SOLID-STATE BATTERY CELLS

BACKGROUND

1. Technical Field

The present disclosure relates to a battery.

2. Description of the Related Art

The voltage and the output of batteries can be increased by electrically connecting single batteries such as battery cells in series. Techniques related to such series-connected batteries are disclosed. For example, Japanese Unexamined Patent Application Publication No. 2000-195495 (Patent Literature 1) discloses an all-solid-state battery that includes bipolar electrodes each having a positive electrode and negative electrode composite current collector. Further, Japanese Unexamined Patent Application Publication No. 2005-317468 (Patent Literature 2) discloses a battery that includes a gel polymer electrolyte, and bipolar electrodes each having current collectors bonded to each other through an adhesive layer made of a metal filler or a carbon filler and an epoxy resin.

SUMMARY

In the related art, there is a demand for highly reliable series-connected batteries.

One non-limiting and exemplary embodiment provides a highly reliable series-connected battery.

In one general aspect, the techniques disclosed here feature a battery including a plurality of solid-state battery cells; and a connection layer located between the solid-state battery cells, wherein each of the solid-state battery cells has a structure in which a positive electrode current collector, a positive electrode active material layer, a solid electrolyte layer including an inorganic solid electrolyte, a negative electrode active material layer, and a negative electrode current collector are laminated in this order, the solid-state battery cells are electrically connected in series, the positive electrode current collector of one of a pair of the solid-state battery cells and the negative electrode current collector of the other of the pair of the solid-state battery cells are laminated via the connection layer, the pair of the solid-state battery cells being adjacent solid-state battery cells among the solid-state battery cells, the connection layer includes a conductive material, and the Young's modulus of the connection layer is lower than the Young's moduli of the positive electrode current collector, the positive electrode active material layer, the solid electrolyte layer, the negative electrode active material layer, and the negative electrode current collector.

The series-connected battery provided according to the present disclosure attains high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Underlying Knowledge Forming Basis of the Present Disclosure

An approach to obtaining a high-voltage battery is, for example, to connect battery cells in series via a bipolar current collector having a positive electrode active material layer on one side and a negative electrode active material layer on the other side. Unfortunately, desired characteristics cannot be obtained, for example, the battery voltage is lowered if a defect such as a pinhole or a tear occurs even at a single location in the bipolar current collector during the laminating (connection) of the battery cells and also due to, for example, external impacts and thermal cycles. This problem is more prominent when the battery is upsized, that is, when the electrode plates are increased in size and more battery cells are connected. For example, a battery having a bipolar current collector is generally fabricated by applying a positive electrode active material layer to one of the front and back sides of the bipolar current collector, and a negative electrode active material layer to the other side, thereby preparing an individual battery cell, and pressing such battery cells together into a unit. If the active material layers on the front and back of the bipolar electrode have in-plane thickness variations or differences in characteristics such as compression characteristics exhibited during pressurization, the bipolar electrode sandwiched between the active material layers tends to undergo stress concentration and suffer defects such as tearing during the fabrication process. Further, laminating of a plurality of battery cells increases the magnitude of stress that is applied to each of the battery cells when the elements constituting the battery cells are expanded or contracted by temperature change, and consequently the battery tends to be broken. Thus, enhanced reliability is required of series-connected batteries in which a plurality of battery cells are electrically connected in series.

The present disclosure thus provides a highly reliable series-connected battery.

SUMMARY OF THE PRESENT DISCLOSURE

A summary of an embodiment of the present disclosure is as follows.

A battery according to one aspect of the present disclosure a battery including a plurality of solid-state battery cells; and a connection layer located between the solid-state battery cells, wherein each of the solid-state battery cells has a structure in which a positive electrode current collector, a positive electrode active material layer, a solid electrolyte layer including an inorganic solid electrolyte, a negative electrode active material layer, and a negative electrode current collector are laminated in this order, the solid-state battery cells are electrically connected in series, the positive electrode current collector of one of a pair of the solid-state battery cells and the negative electrode current collector of the other of the pair of the solid-state battery cells are laminated via the connection layer, the pair of the solid-state battery cells being adjacent solid-state battery cells among the solid-state battery cells, the connection layer includes a conductive material, and the Young's modulus of the connection layer is lower than the Young's moduli of the positive electrode current collector, the positive electrode active material layer, the solid electrolyte layer, the negative electrode active material layer, and the negative electrode current collector.

The battery according to the above aspect has a plurality of solid-state battery cells electrically connected in series, and is thus a series-connected battery. The positive electrode current collector of one of a pair of adjacent solid-state battery cells and the negative electrode current collector of the other solid-state battery cell are laminated together through the connection layer that is easily deformed due to its lower Young's modulus than the elements constituting the solid-state battery cells. Thus, a deformation of the connection layer relaxes the stress on the solid-state battery cells caused by factors such as expansion or contraction of the elements of the solid-state battery cells due to temperature change, and repeated charging and discharging. As a result, the elements constituting the solid-state battery cells are prevented from damage. The connection layer also relaxes stress stemming from external factors such as heat, impact and vibrations to the battery. Thus, the series-connected battery according to the present aspect can realize high reliability.

For example, the connection layer may include a resin.

Because a resin is a material that is softer than other materials such as metals or ceramics, the connection layer formed using a resin easily attains a low Young's modulus. Further, a resin tends to be lower in specific gravity than inorganic materials, and therefore adding a resin to the connection layer results in an increased weight energy density of the battery.

For example, the connection layer may include a solid electrolyte.

A solid electrolyte is a material that is easily deformed by pressurization, and therefore will relax stress on the solid-state battery cells. Thus, the reliability of the battery can be enhanced.

For example, the connection layer may include a void.

In the above case, the voids present in the connection layer also relax stress on the solid-state battery cells. Further, the Young's modulus of the connection layer can be controlled in a wide range by changing, for example, the shape and the volume of the voids.

For example, the thickness of the connection layer may be greater than or equal to 1 µm and less than or equal to 20 µm.

In the above case, the stress on the solid-state battery cells can be relaxed while ensuring no or a small decrease in volumetric energy density. Thus, the reliability and the volumetric energy density of the battery can be concurrently satisfied.

For example, the connection layer may be located inside the outer periphery of the positive electrode current collector and the outer periphery of the negative electrode current collector in plan view.

The above configuration prevents the connection layer from being placed into contact with or being attached to the lateral side of the positive electrode active material layer or the negative electrode active material layer when, for example, the conductive material contained in the connection layer grows to reach the lateral side of the positive electrode active material layer or the negative electrode active material layer, or when the laminated solid-state battery cells is cut. As a result, the occurrence of short circuits and the deterioration in characteristics of the battery can be suppressed, and the battery reliability can be enhanced.

For example, the battery may further include a buffer layer located between the solid-state battery cells and including a different material from the connection layer, and the Young's modulus of the buffer layer may be less than or equal to the Young's moduli of the positive electrode current collector, the positive electrode active material layer, the solid electrolyte layer, the negative electrode active material layer, and the negative electrode current collector.

In the above case, the solid-state battery cells are laminated through the connection layer and the buffer layer that are made of different materials from each other, and thus benefit from relaxation of stress applied to the solid-state battery cells under a wider range of conditions.

For example, the buffer layer may have a frame shape and surround the outer periphery of the connection layer in plan view.

As a result of the buffer layer surrounding the outer periphery of the connection layer, the buffer layer and the connection layer between the solid-state battery cells tend to be deformed equally when stress is applied thereto in any direction.

For example, the Young's modulus of the buffer layer may be lower than the Young's modulus of the connection layer.

In the above case, the buffer layer is more prone to deformation than the connection layer, and thus can be deformed before the connection layer to relax stress, thereby increasing the stress relaxation effects on the solid-state battery cells.

For example, the buffer layer may be free from a conductive material.

When containing no conductive materials, the buffer layer is soft and exhibits a lower thermal conductivity. As a result, the buffer layer is prone to deformation and is unlikely to change temperatures. Thus, the buffer layer functions to buffer external impacts and thermal shocks, and can increase the stress relaxation effects on the solid-state battery cells.

For example, the buffer layer may include the inorganic solid electrolyte described hereinabove.

When the buffer layer includes the same inorganic solid electrolyte as the solid electrolyte layer, the battery can be fabricated efficiently in the manufacturing process.

For example, the inorganic solid electrolyte may have lithium ion conductivity.

The above configuration can enhance the battery reliability of a series-connected lithium ion battery.

Embodiments will be described in detail hereinbelow with reference to the drawings.

The embodiments discussed below illustrate comprehensive or specific examples. The configurations described in the embodiments below such as numerical values, shapes, materials, constituent elements, and the positions and manners of connection of the constituent elements are only illustrative and do not intend to limit the scope of the present disclosure thereto. Of the constituent elements described in the embodiments below, those which are not described in the independent claims reciting the broadest concepts are illustrated as optional constituent elements.

The drawings are not necessarily strict. In the drawings, substantially identical elements are assigned with the same numerals, and overlaps in the description of such elements will be omitted or simplified.

In the present specification and drawings, the x axis, the y axis and the z axis indicate the three axes in a three-dimensional orthogonal coordinate. In the embodiments, the z axis direction is the thickness direction of a battery. In the present specification, the term "thickness direction" is the direction that is perpendicular to the plane up to which layers are laminated.

In the present specification, the phrase "in plan view" means that a battery is viewed along the laminating direction of the battery. In the present specification, the term "thickness" means the length of a battery or a layer in the laminating direction.

In the present specification, "in" and "out" such as in the cases of "inside" and "outside" indicate whether the location of interest is "in"-side or "out"-side of the reference when the battery is viewed along the laminating direction of the battery.

In the present specification, the terms "on (or above)" and "under (or below)" used in the description of battery configurations do not mean being in the upward direction (perpendicularly above) and being in the downward direction (perpendicularly below) in the absolute spatial recognition, but indicate relative positional relationships based on the order in which layers are laminated. Further, the terms "on" and "under" mean not only that two constituent elements are disposed with a spacing therebetween and another constituent element is present between the two constituent elements, but also that two constituent elements are disposed in close and direct contact with each other.

Embodiments

[Overview of Laminated Batteries]

First, a battery according to an embodiment will be described.

Figure 1:
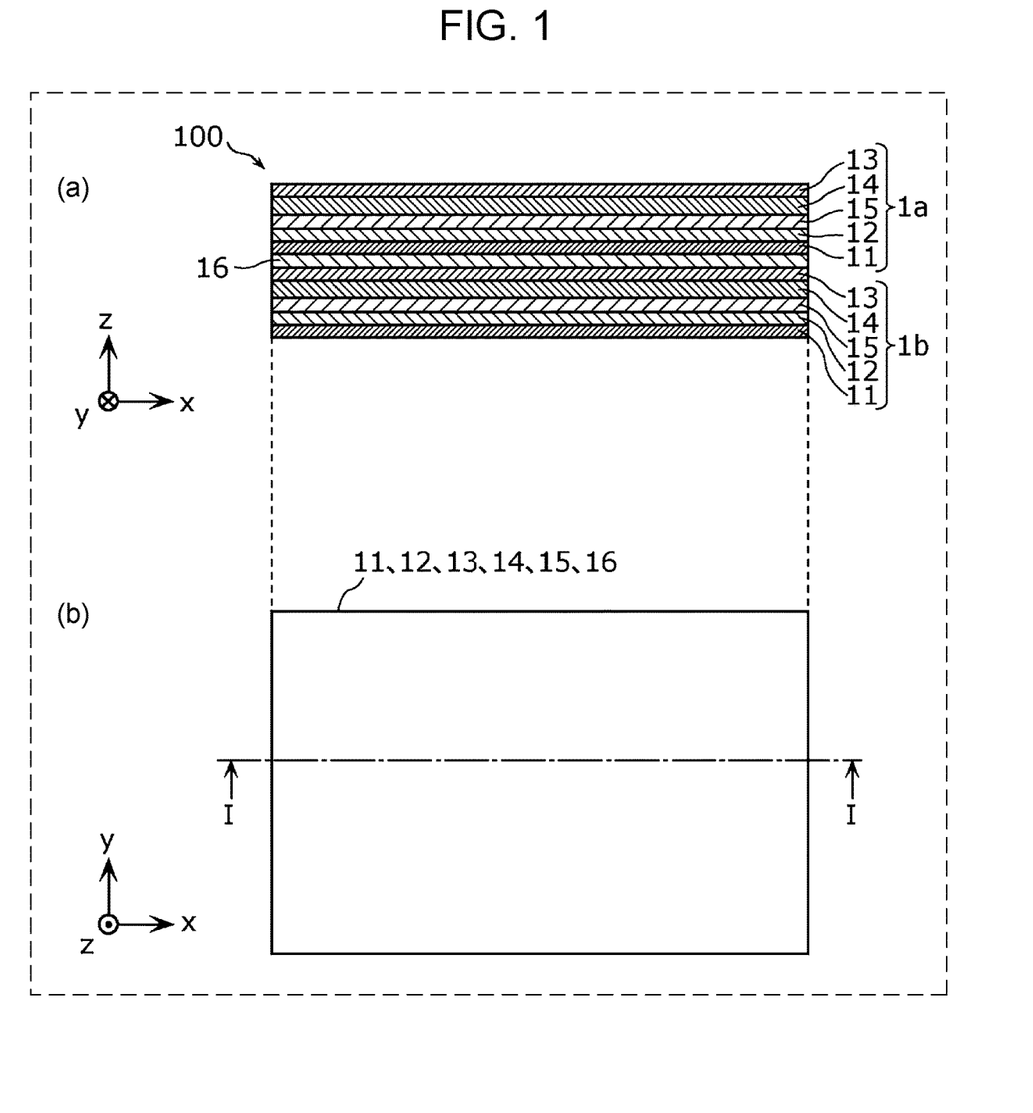
FIG. 1 is a set of views illustrating a schematic configuration of a battery according to an embodiment.

FIG. 1 is a set of views illustrating a schematic configuration of a battery according to the present embodiment. Specifically, FIG. 1A is a sectional view of a battery 100 according to the present embodiment, and FIG. 1B is a plan view of the battery 100 as viewed from above in the z-axis direction. FIG. 1A illustrates a cross section at the position indicated by the line I-I in FIG. 1B. In FIG. 1B, the shapes in plan view of the battery constituent elements viewed from above the battery 100 are drawn by solid lines.

As illustrated in FIG. 1, the battery 100 has a structure in which two solid-state battery cells 1a and 1b are laminated one on top of the other, and includes the solid-state battery cells 1a and 1b, and a connection layer 16 located between the solid-state battery cells 1a and 1b. The battery 100 is a series-connected battery, and the solid-state battery cells 1a and 1b are electrically connected to each other in series. For example, the solid-state battery cell 1a and the solid-state battery cell 1b are electrically connected in series through the connection layer 16.

The solid-state battery cells 1a and 1b each include a positive electrode current collector 11, a positive electrode active material layer 12 disposed in contact with the positive electrode current collector 11, a negative electrode current collector 13, a negative electrode active material layer 14 disposed in contact with the negative electrode current collector 13, and a solid electrolyte layer 15 disposed between the positive electrode active material layer 12 and the negative electrode active material layer 14 and including an inorganic solid electrolyte. The positive electrode active material layer 12 and the negative electrode active material layer 14 are disposed between the positive electrode current collector 11 and the negative electrode current collector 13. The solid-state battery cells 1a and 1b each have a structure in which the positive electrode current collector 11, the positive electrode active material layer 12, the solid electrolyte layer 15, the negative electrode active material layer 14, and the negative electrode current collector 13 are laminated in this order from the underside.

The positive electrode current collector 11, the positive electrode active material layer 12, the solid electrolyte layer 15, the negative electrode active material layer 14, and the negative electrode current collector 13 are each rectangular in plan view. The shapes in plan view of the positive electrode current collector 11, the positive electrode active material layer 12, the solid electrolyte layer 15, the negative electrode active material layer 14, and the negative electrode current collector 13 are not particularly limited and may be shapes other than rectangular such as circular, elliptical or polygonal. The positive electrode current collector 11, the positive electrode active material layer 12, the solid electrolyte layer 15, the negative electrode active material layer 14, and the negative electrode current collector 13 are the same in shape, position and size in plan view.

The two adjacent solid-state battery cells are laminated through the connection layer 16 between the positive electrode current collector 11 of the solid-state battery cell 1a and the negative electrode current collector 13 of the other solid-state battery cell 1b. That is, the two adjacent solid-state battery cells 1a and 1b are laminated through the connection layer 16 in such a manner that the upsides and the downsides of the solid-state battery cells are directed in the same directions. The solid-state battery cells 1a and 1b, and the connection layer 16 are the same in shape, position and size in plan view. The solid-state battery cell 1a and the solid-state battery cell 1b are separated from each other with the connection layer 16 interposed therebetween.

The positive electrode current collector 11, the negative electrode current collector 13, and the solid electrolyte layer 15 in each of the solid-state battery cells 1a and 1b are the same in shape, position and size in plan view. The positive electrode current collector 11 of the solid-state battery cell 1a and the negative electrode current collector 13 of the solid-state battery cell 1b are in contact with the connection layer 16. In the present specification, the positive electrode current collector 11 and the negative electrode current collector 13 may be collectively referred to simply as the "current collectors". The current collectors are not particularly limited as long as formed of a conductive material.

For example, the current collectors that are used may be foil-like bodies, plate-like bodies, mesh-like bodies or other forms of bodies made of such a material as stainless steel, nickel, aluminum, iron, titanium, copper, palladium, gold, platinum, or an alloy of two or more of these metals. The materials of the current collectors may be selected appropriately in consideration of the manufacturing process, the resistance to melting and decomposition at service temperatures and service pressures, the battery operating potentials applied to the current collectors, and conductivity. The materials of the current collectors may also be selected in accordance with the required levels of tensile strength and heat resistance. The current collectors may be high-strength electrolytic copper foils or clad materials in which dissimilar metal foils are laminated.

For example, the thickness of the current collectors is greater than or equal to 10 μm and less than or equal to 100 μm.

The sides of the current collectors that will be in contact with the connection layer 16 may be roughened to have irregularities. In this manner, the quality of contact with respect to the connection layer 16 is enhanced, and the laminated structure of the solid-state battery cells 1a and 1b is strengthened. Further, the sides of the current collectors that will be in contact with the connection layer 16 may be coated with an adhesive component such as a conductive organic binder. In this manner, the adhesion between the current collector and the connection layer 16 may be enhanced.

The positive electrode active material layer 12 is laminated in contact with one side of the positive electrode current collector 11. The positive electrode active material layer 12 includes at least a positive electrode active material. The positive electrode active material layer 12 is a layer principally composed of a positive electrode material such as a positive electrode active material. The positive electrode active material is a material that is oxidized or reduced in conjunction with intercalation or deintercalation of metal ions such as lithium (Li) ions or magnesium (Mg) ions into or from the crystal structure at a higher potential than the negative electrode. The type of the positive electrode active material may be selected appropriately in accordance with the type of the battery, and a known positive electrode active material may be used.

Examples of the positive electrode active materials include compounds containing lithium and a transition metal element, with specific examples including oxides containing lithium and a transition metal element, and phosphoric acid compounds containing lithium and a transition metal element. Examples of the oxides containing lithium and a transition metal element include layered oxides such as lithium nickel composite oxides including $LiNi_xM_{1-x}O_2$ (wherein M is at least one element selected from the group consisting of Co, Al, Mn, V, Cr, Mg, Ca, Ti, Zr, Nb, Mo and W, and x is $0<x\leq1$), lithium cobalt oxide ($LiCoO_2$), lithium nickel oxide ($LiNiO_2$) and lithium manganese oxide ($LiMn_2O_4$), and lithium manganese oxides having a spinel structure (for example, $LiMn_2O_4$, $Li_2MnO_3$ and $LiMnO_2$). Examples of the phosphoric acid compounds containing lithium and a transition metal element include lithium iron phosphate ($LiFePO_4$) having an olivine structure. The positive electrode active material may also include sulfur (S) or a sulfide such as lithium sulfide ($Li_2S$). In this case, the positive electrode active material that is used may be positive electrode active material particles that are coated or combined with, for example, lithium niobium oxide ($LiNbO_3$). The positive electrode active materials may be used singly, or two or more may be used in combination.

As described hereinabove, the positive electrode active material layer 12 includes at least a positive electrode active material. The positive electrode active material layer 12 may be a mixture layer composed of a mixture of a positive electrode active material and an additive material. Examples of the additive materials that may be used include solid electrolytes such as oxide-based solid electrolytes and sulfide-based solid electrolytes, conductive auxiliaries such as acetylene black, and binders such as polyethylene oxide and polyvinylidene fluoride. When the positive electrode active material layer 12 is a mixture of a positive electrode active material and an additive material such as a solid electrolyte in a predetermined ratio, the ion conductivity such as lithium ion conductivity and also the electron conductivity in the positive electrode active material layer 12 may be enhanced.

For example, the thickness of the positive electrode active material layer 12 is greater than or equal to 5 μm and less than or equal to 300 μm.

The negative electrode active material layer 14 is laminated in contact with one side of the negative electrode current collector 13. The negative electrode active material layer 14 includes at least a negative electrode active material. The negative electrode active material layer 14 is a layer principally composed of a negative electrode material such as a negative electrode active material. The negative electrode active material is a material that is oxidized or reduced in conjunction with intercalation or deintercalation of metal ions such as lithium (Li) ions or magnesium (Mg) ions into or from the crystal structure at a lower potential than the positive electrode. The type of the negative electrode active material may be selected appropriately in accordance with the type of the battery, and a known negative electrode active material may be used.

Examples of the negative electrode active materials that may be used include carbon materials such as natural graphite, artificial graphite, graphitized carbon fibers and heated resin carbon, and alloy-based materials miscible with solid electrolytes. Examples of the alloy-based materials that may be used include lithium alloys such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$ and $LiC_6$, oxides of lithium and a transition metal element such as lithium titanium oxide ($Li_4Ti_5O_{12}$), and metal oxides such as zinc oxide (ZnO) and silicon oxide ($SiO_x$). The negative electrode active materials may be used singly, or two or more may be used in combination.

As described hereinabove, the negative electrode active material layer 14 includes at least a negative electrode active material. The negative electrode active material layer 14 may be a mixture layer composed of a mixture of a negative electrode active material and an additive material. Examples of the additive materials that may be used include solid electrolytes such as oxide-based solid electrolytes and sulfide-based solid electrolytes, conductive auxiliaries such as acetylene black, and binders such as polyethylene oxide and polyvinylidene fluoride. When the negative electrode active material layer 14 is a mixture of a negative electrode active material and an additive material such as a solid electrolyte in a predetermined ratio, the ion conductivity such as lithium ion conductivity and also the electron conductivity in the negative electrode active material layer 14 may be enhanced.

For example, the thickness of the negative electrode active material layer 14 is greater than or equal to 5 μm and less than or equal to 300 μm.

The positive electrode active material layer 12 and the negative electrode active material layer 14 in each of the solid-state battery cells 1a and 1b are the same as each other in shape, position and size in plan view.

The solid electrolyte layer 15 in each of the solid-state battery cells 1a and 1b is disposed between the positive electrode active material layer 12 and the negative electrode active material layer 14, and is in contact with the positive electrode active material layer 12 and the negative electrode active material layer 14.

The solid electrolyte layer 15 includes at least an inorganic solid electrolyte as a solid electrolyte. For example, the solid electrolyte layer 15 includes an inorganic solid electrolyte as a principal component. The inorganic solid electrolyte may be a known inorganic solid electrolyte for batteries that has ion conductivity and does not have electron conductivity. The inorganic solid electrolyte that is used may be, for example, an inorganic solid electrolyte capable of conducting metal ions such as lithium ions or magnesium ions. The type of the inorganic solid electrolyte may be selected appropriately in accordance with the type of conducted ions. Examples of the inorganic solid electrolytes that may be used include such solid electrolytes as sulfide-based solid electrolytes, halogen-based solid electrolytes and oxide-based solid electrolytes. The inorganic solid electrolyte that is used may be a sulfide-based solid electrolyte, a halogen-based solid electrolyte or an oxide-based solid electrolyte each having lithium ion conductivity.

Examples of the sulfide-based solid electrolytes that may be used include lithium-containing sulfides such as $Li_2S$—$P_2S_5$ system, $Li_2S$—$SiS_2$ system, $Li_2S$—$B_2S_3$ system, $Li_2S$—$GeS_2$ system, $Li_2S$—$SiS_2$—$LiI$ system, $Li_2S$—$SiS_2$—$Li_3PO_4$ system, $Li_2S$—$Ge_2S_2$ system, $Li_2S$—$GeS_2$—$P_2S_5$ system and $Li_2S$—$GeS_2$—$ZnS$ system. Examples of the oxide-based solid electrolytes that may be used include lithium-containing metal oxides such as $Li_2O$—$SiO_2$ and $Li_2O$—$SiO_2$—$P_2O_5$, lithium-containing metal nitrides such as $Li_xP_yO_{1-z}N_z$, lithium phosphate ($Li_3PO_4$), and lithium-containing transition metal oxides such as lithium titanium oxide. The solid electrolytes may be used singly, or two or more may be used in combination.

The halogen-based solid electrolytes are solid electrolytes including a halide. For example, the halide is a compound composed of Li, M' and X'. M' is at least one element selected from the group consisting of metal elements except Li and metalloid elements. X' is at least one element selected from the group consisting of F, Cl, Br and I. The "metal elements" indicate all the elements found in Groups 1 to 12 of the periodic table (except hydrogen) and all the elements found in Groups 13 to 16 of the periodic table (except B, Si, Ge, As, Sb, Te, C, N, P, O, S and Se). The "metalloid elements" indicate B, Si, Ge, As, Sb and Te. For example, M' may include Y (yttrium). Examples of the halides containing Y include $Li_3YCl_6$ and $Li_3YBr_6$.

Examples of the halides further include $Li_2MgX'_4$, $Li_2FeX'_4$, Li(Al, Ga, In)$X'_4$, $Li_3$(Al, Ga, In)$X'_6$, LiOX' and LiX'. Specific examples of the halides include $Li_3InBr_6$, $Li_3InCl_6$, $Li_2FeCl_4$, $Li_2CrCl_4$, $Li_3OCl$ and LiI.

For example, $Li_7La_3Zr_2O_{12}$ (LLZ), $Li_{1.3}Al_{0.3}Ti_{1.7}(PO_4)_3$ (LATP) or (La, Li)$TiO_3$ (LLTO) may be used as the oxide-based solid electrolyte.

In addition to the inorganic solid electrolyte described above, the solid electrolyte layer 15 may include a binder such as polyethylene oxide or polyvinylidene fluoride.

For example, the thickness of the solid electrolyte layer 15 is greater than or equal to 5 μm and less than or equal to 150 μm.

The material of the inorganic solid electrolyte may be aggregates of particles. Alternatively, the material of the inorganic solid electrolyte may be a sintered structure.

As illustrated in FIG. 1, the positive electrode current collector 11 and the negative electrode current collector 13 in each of the solid-state battery cells 1a and 1b, and the connection layer 16 are the same in shape, position and size in plan view. The positive electrode current collector 11 in the solid-state battery cell 1a, and the negative electrode current collector 13 in the solid-state battery cell 1b are in contact with the connection layer 16 over the entirety of the respective sides adjacent to the connection layer 16.

The Young's modulus of the connection layer 16 is lower than the Young's moduli of the positive electrode current collector 11 and the negative electrode current collector 13. Thus, the connection layer 16, by being deformed, relaxes the stress on the solid-state battery cells 1a and 1b caused by expansion or contraction of the current collectors due to temperature change. Further, the connection layer 16 is deformed between the current collectors by pressurization during the laminating process for the production of the battery 100, and thereby the quality of joint is enhanced between the connection layer 16 and the current collectors on and under the connection layer 16. Furthermore, the interface between the current collector and the connection layer 16 becomes resistant to separation and cracking stemming from, for example, external impacts or thermal cycles. Thus, the reliability of the battery 100 is enhanced.

Further, the Young's modulus of the connection layer 16 is lower than the Young's modulus of the solid electrolyte layer 15. As a result, the connection layer 16, by being deformed, relaxes the stress on the solid-state battery cells 1a and 1b caused by expansion or contraction of the solid electrolyte layer 15 due to temperature change and repeated charging and discharging. Thus, the reliability of the battery 100 is enhanced.

Furthermore, the Young's modulus of the connection layer 16 is lower than the Young's moduli of the positive electrode active material layer 12 and the negative electrode active material layer 14. As a result, the connection layer 16, by being deformed, relaxes the stress on the solid-state battery cells 1a and 1b caused by expansion or contraction of the positive electrode active material layer 12 and the negative electrode active material layer 14 due to temperature change and repeated charging and discharging. Thus, the reliability of the battery 100 is enhanced.

The relative relationships of the above Young's moduli may be measured by pushing a probe into each of the constituent elements along the laminating direction, and comparing pressure-displacement characteristics or relative relationships such as the size of dents.

A material having electron conductivity is used for the connection layer 16. That is, the connection layer 16 includes a conductive material. The connection layer 16 may include a mixture of a conductive material having electron conductivity, and an insulating material having insulating properties such as a resin material or a solid electrolyte material. The types and the blending ratios of the materials used for the connection layer 16 may be selected in consideration of factors such as the ease of production in the manufacturing process, stress relaxation performance, thermal shock resistance, and thermal cycle resistance. From the points of view of the quality of joint established by compressive laminating with the current collectors, and the relaxation of stress on the solid-state battery cells 1a and 1b caused by expansion or contraction of the current collectors due to temperature change, the material used for the connection layer 16 may be, for example, a mixture of a conductive metal, and a solid electrolyte or a resin material that is softer than other constituent elements such as the current collectors.

Examples of the conductive materials that may be used for the connection layer 16 include silver, copper, nickel, zinc, aluminum, palladium, gold, platinum, and alloys combining any of these metals. The conductive material contained in the connection layer 16 may be a semiconductor material.

Further, the connection layer 16 may include a solid electrolyte. Examples of the solid electrolytes used in the connection layer 16 include the inorganic solid electrolytes used in the solid electrolyte layer 15 described hereinabove. The solid electrolyte used in the connection layer 16 and the inorganic solid electrolyte used in the solid electrolyte layer 15 may be of the same type or different types. To produce the battery 100 with high productivity and simplicity, the connection layer 16 may include the same material as the solid electrolyte layer 15. In particular, it is well known that a soft solid electrolyte represented by, for example, a sulfide-based solid electrolyte is deformed by pressure and easily forms joint interfaces between particles of the solid electrolyte. The connection layer 16 including such a solid electrolyte relaxes more easily the stress on the solid-state battery cells 1a and 1b caused by expansion or contraction of the current collectors due to temperature change. As a result, the battery 100 attains enhancements in thermal shock resistance and thermal cycle resistance.

The connection layer 16 may include a resin. The use of a resin makes it easy to form a connection layer 16 that is softer and has a lower Young's modulus than other constituent elements such as the current collectors. Further, because the specific gravity of a resin tends to be lower than that of an inorganic material, the weight energy density of the battery 100 may be increased by using a resin in the connection layer 16.

The resin used for the connection layer 16 may be a thermoplastic resin or a thermosetting resin. Examples of the thermoplastic resins include polyethylene-based resins, polypropylene-based resins, acrylic-based resins, polystyrene-based resins, vinyl chloride-based resins, silicone-based resins, polyamide-based resins, polyimide-based resins, fluorinated hydrocarbon-based resins, polyether-based resins, butadiene rubbers, isoprene rubbers, styrene-butadiene rubbers (SBR), styrene-butadiene-styrene copolymers (SBS), styrene-ethylene-butadiene-styrene copolymers (SEBS), ethylene-propylene rubbers, butyl rubbers, chloroprene rubbers and acrylonitrile-butadiene rubbers. Examples of the thermosetting resins include (i) amino resins such as urea resins, melamine resins and guanamine resins, (ii) epoxy resins such as bisphenol A epoxy resins, bisphenol F epoxy resins, phenol novolak epoxy resins and alicyclic epoxy resins, (iii) oxetane resins, (iv) phenol resins such as resol resins and novolak resins, and (v) silicone-modified organic resins such as silicone epoxies and silicone polyesters. Among these, the thermosetting resin used for the connection layer 16 may be a phenol resin from the point of view of connection strength. From the similar point of view of connection strength, the thermosetting resin used for the connection layer 16 may be an epoxy resin.

The connection layer 16 may be composed of a material containing a solid electrolyte or a resin, and particles of a conductive material or particles of a semiconductor material. The connection layer 16 may include a conductive material as a principal component. For example, the connection layer 16 is composed of a solid electrolyte and a conductive material. In such a case, the connection layer contains less electric resistance components as well as being capable of relaxing the stress described above that is caused by expansion or contraction of constituent elements such as the current collectors due to temperature change. Thus, the battery 100 attains a small electrical loss.

The connection layer 16 may be composed of a thermosetting conductor paste containing a metal and a resin as principal components.

For example, a solid electrolyte may be added to the above conductor paste. When the connection layer 16 is composed of such a material, the thermal expansion coefficient and the softness (the Young's modulus) of the connection layer 16 may be controlled.

The connection layer 16 may have voids such as pores or bubbles containing a gas, for example, air. The voids may be formed by being enclosed by the material of the connection layer 16, or by being enclosed by the connection layer 16 and the current collector. The voids present in the connection layer 16 can relax stress on the solid-state battery cells 1a and 1b. Further, the softness (the Young's modulus) of the connection layer 16 can be controlled in a wide range by changing, for example, the shape and the volume of the voids. As a result, the connection layer can relax more efficiently the stress on the solid-state battery cells 1a and 1b caused by expansion or contraction of constituent elements such as the current collectors due to temperature change. The voids may be formed by any method without limitation. For example, the voids are created by forming the connection layer 16 from aggregates of a powder material. Alternatively, the voids may be created by forming the connection layer 16 from a resin containing bubbles.

The connection layer 16 may include a non-flammable material such as a metal, a ceramic or a solid electrolyte. When containing a non-flammable material, the connection layer 16 also acts effectively as a wall layer that prevents catching of fire in the event of battery overheating.

The connection layer 16 may not be formed over the entirety of the sides of the current collectors in contact therewith, and may be formed partially, for example, may be patterned on the sides of the current collectors in contact therewith.

The connection layer 16 may be composed of a plurality of layers of different materials.

The thickness of the connection layer 16 is not particularly limited, but a smaller thickness is more advantageous from the point of view of the volumetric energy density of the battery. From the point of view of the volumetric energy density, the thickness of the connection layer 16 may be smaller than the thickness of the current collector. For example, the thickness of the connection layer 16 is greater than or equal to 1 μm and less than or equal to 20 μm, and preferably greater than or equal to 2 μm and less than or equal to 10 μm. When the thickness of the connection layer 16 is within the above range, the decrease in volumetric energy density is small while ensuring that the connection layer will relax stress caused by expansion or contraction of constituent elements such as the current collectors due to temperature change.

The specific gravity of the connection layer 16 is not particularly limited, but a lower specific gravity is more preferable from the point of view of weight energy density. The specific gravity of the connection layer 16 may be lower than the specific gravity of the current collector. Such a connection layer has less influence on the weight energy density and allows the battery to attain a high energy density.

As described hereinabove, the battery 100 according to the present embodiment includes a plurality of solid-state battery cells 1a and 1b, and a connection layer 16 located between the solid-state battery cells 1a and 1b. The solid-state battery cells 1a and 1b each have a structure in which a positive electrode current collector 11, a positive electrode active material layer 12, a solid electrolyte layer 15 including an inorganic solid electrolyte, a negative electrode active material layer 14, and a negative electrode current collector 13 are laminated in this order. The solid-state battery cells 1a and 1b are electrically connected to each other in series. The positive electrode current collector 11 of the solid-state battery cell 1a and the negative electrode current collector 13 of the solid-state battery cell 1b are laminated together through the connection layer 16. The connection layer 16 includes a conductive material, and the Young's modulus of the connection layer 16 is lower than the Young's moduli of the positive electrode current collector 11, the positive electrode active material layer 12, the solid electrolyte layer 15, the negative electrode active material layer 14, and the negative electrode current collector 13.

As described above, the solid-state battery cells 1a and 1b are electrically connected to each other in series, and therefore the battery 100 is a series-connected battery. The positive electrode current collector 11 of the solid-state battery cell 1a and the negative electrode current collector 13 of the solid-state battery cell 1b are laminated together through the connection layer 16 that is easily deformed due to having a lower Young's modulus than the constituent elements in the solid-state battery cells 1a and 1b. Thus, the connection layer 16, by being deformed, relaxes the stress on the solid-state battery cells 1a and 1b caused by factors such as expansion or contraction of the constituent elements in the solid-state battery cells 1a and 1b due to temperature change, and repeated charging and discharging. As a result, the constituent elements in the solid-state battery cells 1a and 1b are protected from damage. Further, the connection layer 16 also relaxes stress stemming from external heat, impacts and vibrations to the battery 100. Thus, the series-connected battery 100 can realize high reliability.

The presence of the connection layer 16 described hereinabove reduces the occurrence of damage to the constituent elements in the solid-state battery cells even when, for example, the battery is produced with more layers and is upsized. Thus, a highly reliable battery of high output and high capacity can be realized.

Further, because the two current collectors and the connection layer 17 are present between the positive electrode active material layer 12 of the solid-state battery cell 1a and the negative electrode active material layer 14 of the solid-state battery cell 1b, there is no contact between the positive electrode active material layer 12 of the solid-state battery cell 1a and the negative electrode active material layer 14 of the solid-state battery cell 1b even in the case where one of the current collectors is damaged. Thus, the battery characteristics of the battery 100 are maintained.

When compared to the configurations of the batteries described in Patent Literature 1 and Patent Literature 2, the configuration of the battery 100 according to the present embodiment has the following differences.

Patent Literature 1 discloses an all-solid-state battery that includes bipolar electrodes each having a composite current collector. However, the composite current collector described in Patent Literature 1 is formed by metal bonding of two current collectors, and the two current collectors are joined by, for example, plating or by cladding of respective materials. Thus, the composite current collector does not have a connecting portion having a stress-relaxing action. That is, the connecting portion formed by joining of the metal materials cannot attain a stress-relaxing action in contrast to the connection layer 16 in the battery 100 according to the present embodiment. Thus, stress generated in the bipolar electrodes during the laminating process for the production of a multi-layered battery or due to, for example, thermal shocks, tends to result in damage, and also tends to cause adhesion failures and gaps between the current collector and a power-generating element. Problems are thus encountered in manufacturing a multi-layered bipolar battery.

Patent Literature 2 discloses a bipolar battery that includes a gel polymer electrolyte, and bipolar electrodes each having current collectors connected to each other through an adhesive layer. The adhesive layer connecting the current collectors includes components such as a metal filler and an epoxy resin. However, this adhesive layer cannot offer a reliability enhancement effect through stress relaxation in contrast to the case of the battery 100 according to the present embodiment. To ensure that the adhesive layer will relax stress similarly to the connection layer 16 in the battery 100 according to the present embodiment, it is indispensable that the adhesive layer be softer than the battery constituent elements such as the current collectors and the electrolyte. The electrolyte used in the configuration is a soft gel polymer electrolyte, and thus the adhesive layer does not exhibit a stress-relaxing effect between the bipolar electrodes. Consequently, stress generated in the bipolar electrodes tends to cause structural defects and characteristics deterioration in the multi-layered laminated battery. Problems are thus encountered in manufacturing a multi-layered battery. In contrast, the battery 100 according to the present embodiment suppresses the occurrence of the above problems because stress generated in the solid-state battery cells 1a and 1b is relaxed by the connection layer 16. Further, Patent Literature 1 and Patent Literature 2 do not disclose or suggest a series-connected battery having a connection layer 16 according to the present embodiment.

Modification Example 1

Hereinbelow, Modification Example 1 of the embodiment will be described. The following description of Modification Example 1 will focus on the differences from the embodiment, and will omit or simplify the explanation of commonalities.

Figure 2:
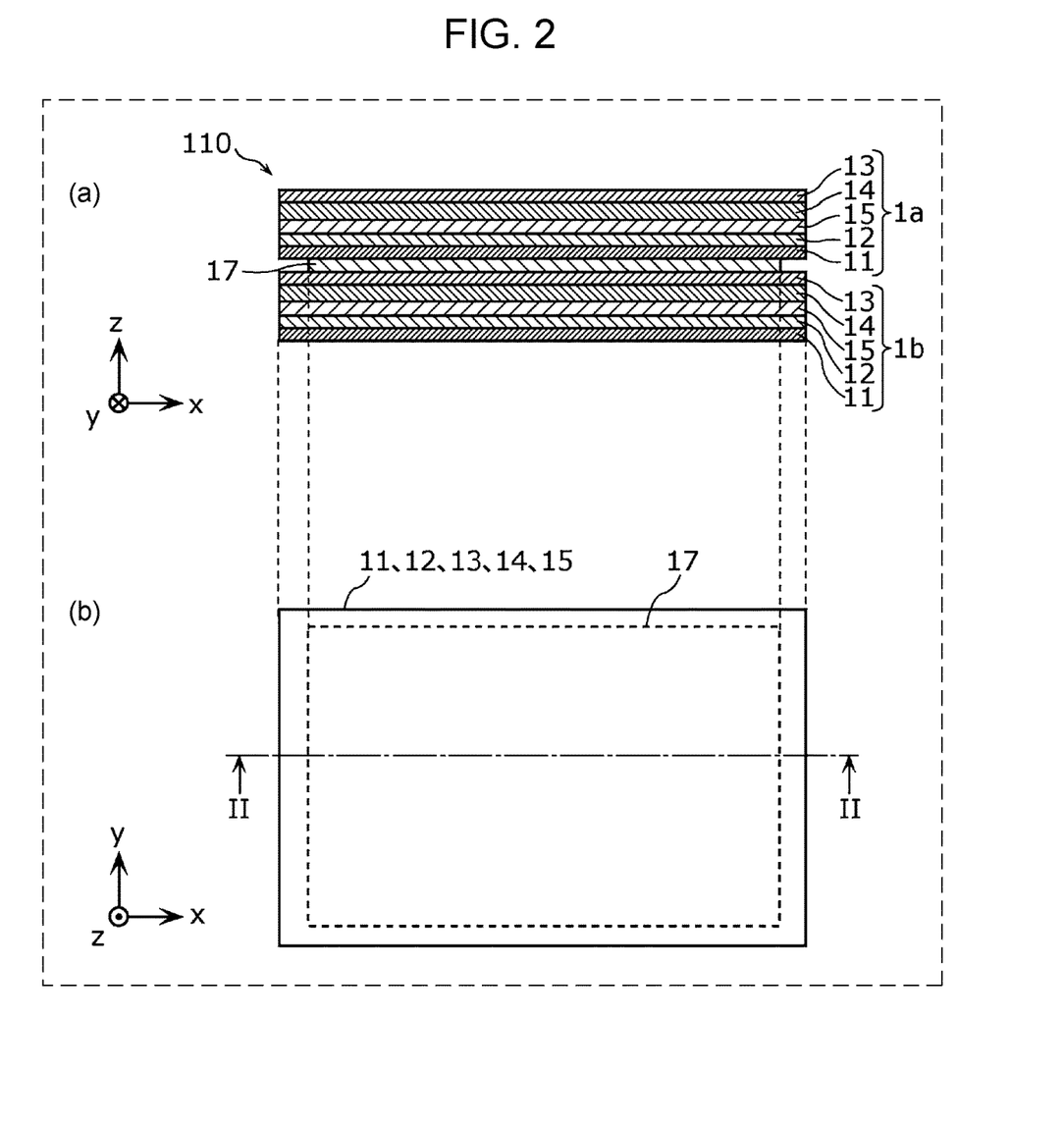
FIG. 2 is a set of views illustrating a schematic configuration of a battery according to Modification Example 1 of the embodiment.

FIG. 2 is a set of views illustrating a schematic configuration of a battery according to Modification Example 1 of the embodiment. Specifically, FIG. 2A is a sectional view of a battery 110 according to the present embodiment, and FIG. 2B is a plan view of the battery 110 as viewed from above in the z-axis direction. FIG. 2A illustrates a cross section at the position indicated by the line II-II in FIG. 2B. In FIG. 2B, the shapes in plan view of the battery constituent elements viewed from above the battery 110 are drawn by solid lines or broken lines.

As illustrated in FIG. 2, the battery 110 according to Modification Example 1 of the embodiment differs from the battery 100 of the embodiment in that instead of the connection layer 16, a connection layer 17 is disposed inside the outer periphery of the current collectors in plan view.

The battery 110 has a structure in which two solid-state battery cells 1a and 1b are laminated one on top of the other, and includes the solid-state battery cells 1a and 1b and the connection layer 17 located between the solid-state battery cells 1a and 1b.

The two adjacent solid-state battery cells are laminated through the connection layer 17 between a positive electrode current collector 11 of the solid-state battery cell 1a and a negative electrode current collector 13 of the other solid-state battery cell 1b. That is, the solid-state battery cell 1a and the solid-state battery cell 1b are laminated through the connection layer 17 in such a manner that the upsides and the downsides of the solid-state battery cells are directed in the same directions.

In plan view, the area of the connection layer 17 is smaller than those of the positive electrode current collector 11 and the negative electrode current collector 13. The connection layer 17 is located inside the outer periphery of the positive electrode current collector 11 and the outer periphery of the negative electrode current collector 13 in plan view. The materials used for the connection layer 17, and other characteristics of the connection layer 17 are the same as those of the connection layer 16.

The connection layer 17 is located inside the outer periphery of the positive electrode current collector 11 and the outer periphery of the negative electrode current collector 13 in plan view. This configuration keeps the connection layer 17 away from contact with the lateral side of a positive electrode active material layer 12 or a negative electrode active material layer 14 due to migration of the conductive material such as a metal contained in the connection layer 17 (that is, growth of the conductive material such as a metal contained in the connection layer), and also prevents the connection layer 17 from being placed into contact with or being attached to the lateral side of the positive electrode active material layer 12 or the negative electrode active material layer 14 when the laminated solid-state battery cells is cut with, for example, a Thomson blade. As a result, short circuits and characteristics deterioration of the battery 110 can be suppressed, and the series-connected battery 110 can realize high reliability.

Modification Example 2

Hereinbelow, Modification Example 2 of the embodiment will be described. The following description of Modification Example 2 will focus on the differences from Modification Example 1, and will omit or simplify the explanation of commonalities.

Figure 3:
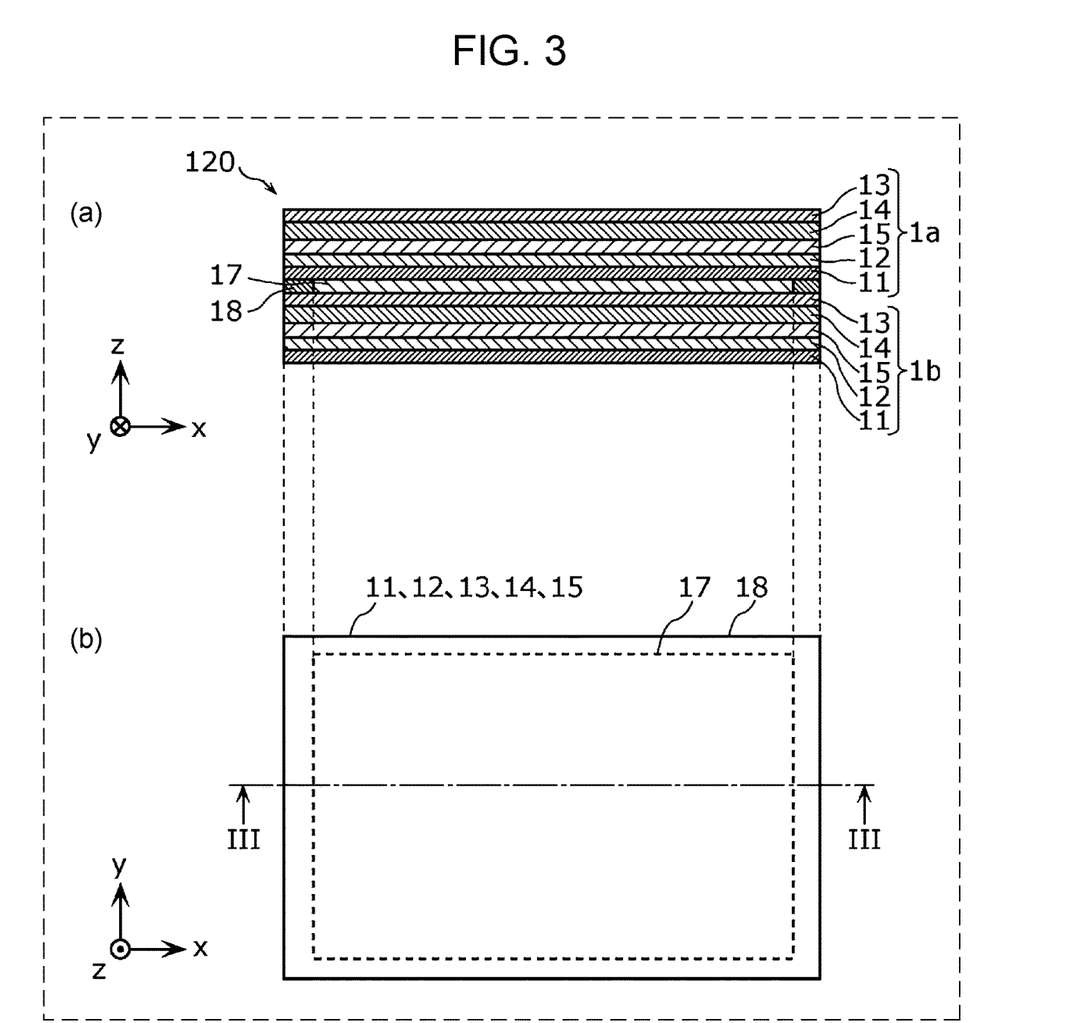
FIG. 3 is a set of views illustrating a schematic configuration of a battery according to Modification Example 2 of the embodiment.

FIG. 3 is a set of views illustrating a schematic configuration of a battery according to Modification Example 2 of the embodiment. Specifically, FIG. 3A is a sectional view of a battery 120 according to the present embodiment, and FIG. 3B is a plan view of the battery 120 as viewed from above in the z-axis direction. FIG. 3A illustrates a cross section at the position indicated by the line in FIG. 3B. In FIG. 3B, the shapes in plan view of the battery constituent elements viewed from above the battery 120 are drawn by solid lines or broken lines.

As illustrated in FIG. 3, the battery 120 according to Modification Example 2 of the embodiment differs from the battery 110 of Modification Example 1 in that a buffer layer 18 is further provided so as to surround the outer periphery of a connection layer 17.

The battery 120 has a structure in which two solid-state battery cells 1a and 1b are laminated one on top of the other, and includes the solid-state battery cells 1a and 1b, and the connection layer 17 and the buffer layer 18 located between the solid-state battery cells 1a and 1b.

A positive electrode current collector 11 of the solid-state battery cell 1a and a negative electrode current collector 13 of the solid-state battery cell 1b are laminated through the connection layer 17 and the buffer layer 18. That is, the solid-state battery cell 1a and the solid-state battery cell 1b are laminated through the connection layer 17 and the buffer layer 18 in such a manner that the upsides and the downsides of the solid-state battery cells are directed in the same directions.

The buffer layer 18 is in contact with the positive electrode current collector 11 of the solid-state battery cell 1a and the negative electrode current collector 13 of the solid-state battery cell 1b. In plan view, the outer periphery of the buffer layer 18 coincides with the outer peripheries of the positive electrode current collector 11, a positive electrode active material layer 12, a solid electrolyte layer 15, a negative electrode active material layer 14, and the negative electrode current collector 13. In plan view, the buffer layer 18 has a frame shape and surrounds the connection layer 17. The buffer layer 18 is in contact with all the lateral sides of the connection layer 17. Incidentally, the buffer layer 18 and the connection layer 17 may be separated from each other. Further, the outer periphery of the buffer layer 18 may be located inside the outer peripheries of the positive electrode current collector 11 and the negative electrode current collector 13.

The Young's modulus of the buffer layer 18 is less than or equal to the Young's moduli of the positive electrode current collector 11, the positive electrode active material layer 12, the solid electrolyte layer 15, the negative electrode active material layer 14, and the negative electrode current collector 13. The buffer layer 18 is composed of a different material from the connection layer 17. As described above, the solid-state battery cell 1a and the solid-state battery cell 1b are laminated through the connection layer 17 and the buffer layer 18 that are made of different materials from each other, and thus benefit from relaxation of stress applied to the solid-state battery cells 1a and 1b under a wider range of conditions.

The Young's modulus of the buffer layer 18 may be lower than the Young's modulus of the connection layer 17. In this case, the buffer layer 18 is more prone to deformation than the connection layer 17 and thus can be deformed before the connection layer 17 to relax stress, thereby increasing the stress relaxation effects on the solid-state battery cells 1a and 1b in the battery 120.

The buffer layer 18 may include an inorganic solid electrolyte usable in the solid electrolyte layer 15. For example, the buffer layer 18 is formed using the same material as the inorganic solid electrolyte used for the solid electrolyte layer 15. By using the same material for the buffer layer 18 as well as for the solid electrolyte layers 15 constituting the solid-state battery cells 1a and 1b, the battery 120 can be fabricated efficiently in the manufacturing process.

For example, the buffer layer 18 may be formed by coating such as die coating in a usual thick film-forming process, or by a screen or metal mask printing process. The buffer layer 18 may be formed before or after the connection layer 17 is formed. As long as the conductivity between the solid-state battery cell 1a and the solid-state battery cell 1b is not impaired, the connection layer 17 and the buffer layer 18 may be formed as a single layer of mixed structures by using a mixture paste of the respective materials.

The buffer layer 18 may include at least one type of material selected from the solid electrolytes, the positive electrode active materials and the negative electrode active materials usable in the positive electrode active material layers 12 and the negative electrode active material layers 14 of the solid-state battery cells 1a and 1b. In this case, properties such as softness, compression characteristics exhibited during pressurization, and thermal expansion and contraction characteristics of the buffer layer 18 between the solid-state battery cell 1a and the solid-state battery cell 1b may approach the properties of the positive electrode active material layers 12 and the negative electrode active material layers 14. Consequently, the reliability of the multi-layered battery may be enhanced. Further, the stress relaxation performance with respect to the solid-state battery cells 1a and 1b can be controlled over a wide range as a result of the electron conductive connection layer 17 and the buffer layer 18 being present between the solid-state battery cell 1a and the solid-state battery cell 1b. Such an effect is obtained also when the buffer layer 18 includes an inorganic solid electrolyte usable in the solid electrolyte layer 15.

The buffer layer 18 may contain no conductive materials. For example, the buffer layer 18 may be composed of the materials for the connection layer 17 except any conductive materials. The removal of conductive materials such as metals from the materials for the buffer layer 18 eliminates materials with a high Young's modulus and a high thermal conductivity. The buffer layer 18 free from conductive materials tends to be softer than the connection layer 17, and is also low in thermal conductivity. As a result, the buffer layer 18 is prone to deformation and is unlikely to change temperatures, and thus functions to buffer external impacts and thermal shocks, and can increase the stress relaxation effects on the solid-state battery cells $1a$ and $1b$. Further, easy deformation of the buffer layer 18 enhances the quality of joint between the buffer layer 18 and the current collectors adjacent thereto.

Battery Production Methods

Next, an example method for producing the battery according to the present embodiment will be described. The following describes a method for producing the battery 120 according to Modification Example 2 of the embodiment described hereinabove.

First, pastes are prepared that are used for printing of a positive electrode active material layer 12 and a negative electrode active material layer 14. A solid electrolyte is provided for use in each of a mixture for a positive electrode active material layer 12 and a mixture for a negative electrode active material layer 14. For example, the solid electrolyte is a $Li_2S$—$P_2S_5$-based sulfide glass powder having an average particle size of about 10 μm and principally including a triclinic crystal. For example, this glass powder may be a glass powder having a high ion conductivity of about 2 to $3 \times 10^{-3}$ S/cm. The positive electrode active material used here may be, for example, a powder of a layered Li.Ni.Co.Al composite oxide ($LiNi_{0.8}Co_{0.15}Al_{0.05}O_2$) having an average particle size of about 5 μm. A mixture containing the positive electrode active material and the glass powder is dispersed into a medium such as an organic solvent to give a positive electrode active material layer paste. The negative electrode active material used here may be, for example, a natural graphite powder having an average particle size of about 10 μm. A mixture containing the negative electrode active material and the glass powder is similarly dispersed into a medium such as an organic solvent to give a negative electrode active material layer paste.

Next, for example, a copper foil having a thickness of about 30 μm is provided as a material for use as a positive electrode current collector 11 and a negative electrode current collector 13. The positive electrode active material layer paste and the negative electrode active material layer paste are, for example, each printed by a screen printing method in a predetermined shape and a thickness of about 50 μm to 100 μm onto one side of the respective sheets of the copper foil. The positive electrode active material layer paste and the negative electrode active material layer paste are dried at 80° C. to 130° C. and become 30 μm to 60 μm in thickness. The above process results in a positive electrode plate that includes a positive electrode current collector 11 and a positive electrode active material layer 12 disposed thereon, and a negative electrode plate that includes a negative electrode current collector 13 and a negative electrode active material layer 14 disposed thereon.

Next, a paste used for printing of a solid electrolyte layer 15 is prepared. A mixture that contains the glass powder described hereinabove is dispersed into a medium such as an organic solvent to give a solid electrolyte layer paste. Using a metal mask, the solid electrolyte layer paste is printed with a thickness of, for example, about 100 μm onto the surface of the positive electrode active material layer 12 in the positive electrode plate and also onto the surface of the negative electrode active material layer 14 in the negative electrode plate. The positive electrode plate and the negative electrode plate printed with the solid electrolyte layer paste are dried at 80° C. to 130° C.

Next, the positive electrode plate and the negative electrode plate are laminated together in such a manner that the solid electrolyte printed on the positive electrode active material layer 12 of the positive electrode plate is opposed in contact to the solid electrolyte printed on the negative electrode active material layer 14 of the negative electrode plate.

Next, the laminated body thus obtained is pressed with a pressure die. Specifically, elastic sheets having a thickness of 70 μm and an elastic modulus of about $5 \times 10^6$ Pa are inserted between the laminated body and the pressure die plates, that is, onto the upper sides of the current collectors in the laminated body. With this configuration, pressure is applied to the laminated body through the elastic sheets. Subsequently, the laminated body is pressed for 90 seconds while heating the pressure die at 50° C. at a pressure of 300 MPa. As a result, a solid-state battery cell $1a$ is obtained. A solid-state battery cell $1b$ is obtained in the similar manner as described above.

Next, a material for a connection layer 17, specifically, a thermosetting conductor paste containing silver particles with an average particle size of 0.5 μm is screen printed with a thickness of about 30 μm to form a pattern on the surface of the negative electrode current collector 13 in the solid-state battery cell $1b$ produced as described above. During this process, the conductor paste is printed inside the outer periphery of the negative electrode current collector 13 in plan view. Next, a solid electrolyte layer paste as a material for a buffer layer 18 is printed through a metal mask to form a pattern. During this process, the solid electrolyte layer paste is printed so as to surround the outer periphery of the conductor paste in plan view. A connection layer 17 and a buffer layer 18 are thus formed on the negative electrode current collector 13 in the solid-state battery cell $1b$.

Next, the solid-state battery cells are pressure bonded to each other in a predetermined positional relationship in which the positive electrode current collector 11 of the solid-state battery cell $1a$ is in contact with the connection layer 17 and the buffer layer 18 formed on the negative electrode current collector 13 of the solid-state battery cell $1b$. Subsequently, thermosetting treatment is performed in the air at about 100° C. to 300° C. for 60 minutes while applying a pressure of, for example, about 1 kg/cm$^2$ to keep stationary the solid-state battery cell $1a$ and the solid-state battery cell $1b$. The unit is then cooled to room temperature. A battery 120 is thus obtained. When three or more solid-state battery cells are to be laminated, the corresponding number of solid-state battery cells are provided and are repeatedly laminated while repeating the formation of the connection layer 17 and the buffer layer 18.

The battery fabrication method and the order of the steps are not limited to the above example.

While the production method described above illustrates that the positive electrode active material layer paste, the negative electrode active material layer paste, the solid electrolyte layer paste, and the conductor paste are applied by printing, the application method is not limited to printing and may be, for example, a doctor blade method, a calender method, a spin coating method, a dip coating method, an inkjet method, an offset method, a die coating method or a spraying method.

While the production method described above illustrates that the conductor paste is a thermosetting conductor paste containing silver metal particles, but the conductor paste is not limited thereto and may be, for example, a conductive resin paste containing metal particles and a resin as principal components. The conductor paste that is used may be a thermosetting conductor paste that contains highly conductive high-melting metal particles, low-melting metal particles and a resin. For example, the melting point of the highly conductive high-melting metal particles is greater than or equal to 400° C. Examples of the materials of the highly conductive high-melting metal particles include silver, copper, nickel, zinc, aluminum, palladium, gold, platinum, and alloys combining any of these metals. The melting point of the low-melting metal particles may be lower than or equal to the curing temperature of the conductor paste and is, for example, lower than or equal to 300° C. Examples of the materials of the low-melting metal particles having a melting point of lower than or equal to 300° C. include tin, tin-zinc alloy, tin-silver alloy, tin-copper alloy, tin-aluminum alloy, tin-lead alloy, indium, indium-silver alloy, indium-zinc alloy, indium-tin alloy, bismuth, bismuth-silver alloy, bismuth-nickel alloy, bismuth-tin alloy, bismuth-zinc alloy and bismuth-lead alloy. By virtue of the conductor paste containing such low-melting metal particles, solid-phase reaction and liquid-phase reaction proceed at contact sites between the metal particles in the conductor paste and the metal in the current collectors even when the thermosetting temperature is lower than the melting point of the highly conductive high-melting metal particles. The solid-phase and liquid-phase reactions at the interface between the conductor paste and the surfaces of the current collectors form an alloy, which diffuses in the vicinity of the contact sites. When, for example, silver or a silver alloy is used as the highly conductive high-melting metal particles and copper is used as the current collectors, the alloy that will be formed is a highly conductive silver-copper alloy. Depending on the combination of the highly conductive high-melting metal particles and the current collectors, for example, a silver-nickel alloy or a silver-palladium alloy may also be formed. As a result of the configuration described above, the current collectors in contact with the connection layer 17 are more strongly joined together, and the joints between the connection layer 17 and the current collector are resistant to separation due to factors such as, for example, thermal cycles or impacts.

The highly conductive high-melting metal particles and the low-melting metal particles may have any shapes such as spherical shapes, scale-like shapes and acicular shapes. The particle sizes of the highly conductive high-melting metal particles and the low-melting metal particles are not particularly limited. In view of the fact that, for example, particles having a smaller size undergo the alloying reactions and diffusion at a lower temperature, the particle size and the shape are selected appropriately in consideration of the process design and the influence of the thermal history on the battery characteristics.

The resin used in the thermosetting conductor paste may be any resin that functions as a binder, and may be selected appropriately based on, for example, printability or applicability depending on the production process that will be adopted. For example, the resin used in the thermosetting conductor paste includes a thermosetting resin. Examples of the thermosetting resins include (i) amino resins such as urea resins, melamine resins and guanamine resins, (ii) epoxy resins such as bisphenol A epoxy resins, bisphenol F epoxy resins, phenol novolak epoxy resins and alicyclic epoxy resins, (iii) oxetane resins, (iv) phenol resins such as resol resins and novolak resins, and (v) silicone-modified organic resins such as silicone epoxies and silicone polyesters. These resin materials may be used singly, or two or more may be used in combination.

Other Embodiments

While the battery according to the present disclosure has been illustrated based on the above embodiment, the scope of the present disclosure is not limited to the above embodiment and includes various modifications from the embodiment that can be conceived by those skilled in the art, and other embodiments constructed by combining some constituent elements in the embodiments, without departing from the spirit of the present disclosure.

For example, while the embodiment and the modification examples described hereinabove have illustrated the positive electrode current collector 11, the positive electrode active material layer 12, the solid electrolyte layer 15, the negative electrode active material layer 14, and the negative electrode current collector 13 as having the same shape, position and size in plan view, their configuration is not limited thereto. In plan view, the areas of the positive electrode current collector 11, the negative electrode current collector 13 and the solid electrolyte layer 15 may be larger than the areas of the positive electrode active material layer 12 and the negative electrode active material layer 14, and the solid electrolyte layer 15 may be in contact with the lateral sides of the positive electrode active material layer 12 and the negative electrode active material layer 14, as well as with the positive electrode current collector 11 and the negative electrode current collector 13. That is, the positive electrode current collector 11 may be in contact with the positive electrode active material layer 12 and the solid electrolyte layer 15, and the negative electrode current collector 13 may be in contact with the negative electrode active material layer 14 and the solid electrolyte layer 15. Even when a plurality of layers of different materials are in contact with each of the positive electrode current collector 11 and the negative electrode current collector 13 as in the above case, the connection layer 16 through which the positive electrode current collector 11 and the negative electrode current collector 13 are laminated together can relax stress arising from any material of the above layers and thus prevents the positive electrode current collector 11 and the negative electrode current collector 13 from being damaged by the stress. Further, the area of the negative electrode active material layer 14 in plan view may be larger than the area of the positive electrode active material layer 12.

While Modification Example 2 of the embodiment has illustrated the buffer layer 18 as having a frame shape and surrounding the connection layer 17 in plan view, the arrangement of the buffer layer 18 and the connection layer 17 is not particularly limited thereto as long as the conductivity between the solid-state battery cell 1a and the solid-state battery cell 1b is not impaired. For example, the buffer layer 18 may be provided outside at least one of the lateral sides of the connection layer 17. Alternatively, the buffer layer 18 may be surrounded by the connection layer 17. Still alternatively, the buffer layers 18 and the connection layers 17 may be arranged alternately in stripes.

Various modifications such as changes, replacements, additions and omissions may be made to the embodiments described hereinabove within the scope of the claims and the equivalence thereof.

The battery according to the present disclosure may be used as, for example, a secondary battery such as an all-solid-state battery in various types of apparatuses such as electronic devices and automobiles.

What is claimed is:
1. A battery comprising:
a plurality of solid-state battery cells;
a buffer layer located between the solid-state battery cells; and
a connection layer located between the solid-state battery cells, wherein each of the solid-state battery cells has a structure in which a positive electrode current collector, a positive electrode active material layer, a solid electrolyte layer including an inorganic solid electrolyte, a negative electrode active material layer, and a negative electrode current collector are laminated in this order, the solid-state battery cells are electrically connected in series, the positive electrode current collector of one of a pair of the solid-state battery cells and the negative electrode current collector of the other of the pair of the solid-state battery cells are laminated via the connection layer, the pair of the solid-state battery cells being adjacent solid-state battery cells among the solid-state battery cells, the connection layer includes a conductive material, the buffer layer includes the inorganic solid electrolyte and a different material from the connection layer, and the Young's modulus of the connection layer is lower than the Young's moduli of the positive electrode current collector, the positive electrode active material layer, the solid electrolyte layer, the negative electrode active material layer, and the negative electrode current collector.

2. The battery according to claim 1, wherein the connection layer includes a resin.

3. The battery according to claim 1, wherein the connection layer includes a solid electrolyte.

4. The battery according to claim 1, wherein the connection layer includes a void.

5. The battery according to claim 1, wherein the thickness of the connection layer is greater than or equal to 1 μm and less than or equal to 20 μm.

6. The battery according to claim 1, wherein the connection layer is located inside the outer periphery of the positive electrode current collector and the outer periphery of the negative electrode current collector in plan view.

7. The battery according to claim 6, wherein the Young's modulus of the buffer layer is less than or equal to the Young's moduli of the positive electrode current collector, the positive electrode active material layer, the solid electrolyte layer, the negative electrode active material layer, and the negative electrode current collector.

8. The battery according to claim 7, wherein the buffer layer has a frame shape and surrounds the outer periphery of the connection layer in plan view.

9. The battery according to claim 7, wherein the Young's modulus of the buffer layer is lower than the Young's modulus of the connection layer.

10. The battery according to claim 7, wherein the buffer layer is free from a conductive material.

11. The battery according to claim 1, wherein the inorganic solid electrolyte has lithium ion conductivity.

* * * * *